(12) United States Patent
Kwon

(10) Patent No.: US 6,434,112 B1
(45) Date of Patent: Aug. 13, 2002

(54) FRAME TRANSMISSION METHOD

(75) Inventor: Ki Jo Kwon, Kyungki-do (KR)

(73) Assignee: LG Semicon Co., Ltd., Cheongju-Si (KR)

(*) Notice: Subject to any disclaimer, the term of this patent is extended or adjusted under 35 U.S.C. 154(b) by 0 days.

(21) Appl. No.: 09/177,511

(22) Filed: Oct. 23, 1998

(30) Foreign Application Priority Data

Oct. 25, 1997 (KR) ............................................. 97/54992

(51) Int. Cl.[7] ........................ G01R 31/08; H04L 12/413
(52) U.S. Cl. ...................................... 370/216; 370/445
(58) Field of Search ................................ 370/216, 229, 370/237, 238, 321, 235, 337, 347, 442, 445

(56) References Cited

U.S. PATENT DOCUMENTS 5,651,009 A * 7/1997 Perreault et al. ............ 370/447
5,940,399 A * 8/1999 Weizman ..................... 370/445
5,966,378 A * 10/1999 Hamalainen ................. 370/348

OTHER PUBLICATIONS

ANSI/IEEE Std. 802.3, 1993 Edition, pp. 45, 51, and 53–55.

* cited by examiner

Primary Examiner—Wellington Chin
Assistant Examiner—Brenda Pham
(74) Attorney, Agent, or Firm—Birch, Stewart, Kolasch & Birch, LLP

(57) ABSTRACT

A method of transmitting a frame on a communications medium by a node of a local area network in which a node without priorit employs a conventional IEEE 802.3 CSMA/CD medium-access method and a node with priority employs the conventional IEEE 802.3 CSMA/CD medium-access method less the steps of delaying transmission by minimum inter-frame and random back-off intervals.

2 Claims, 2 Drawing Sheets

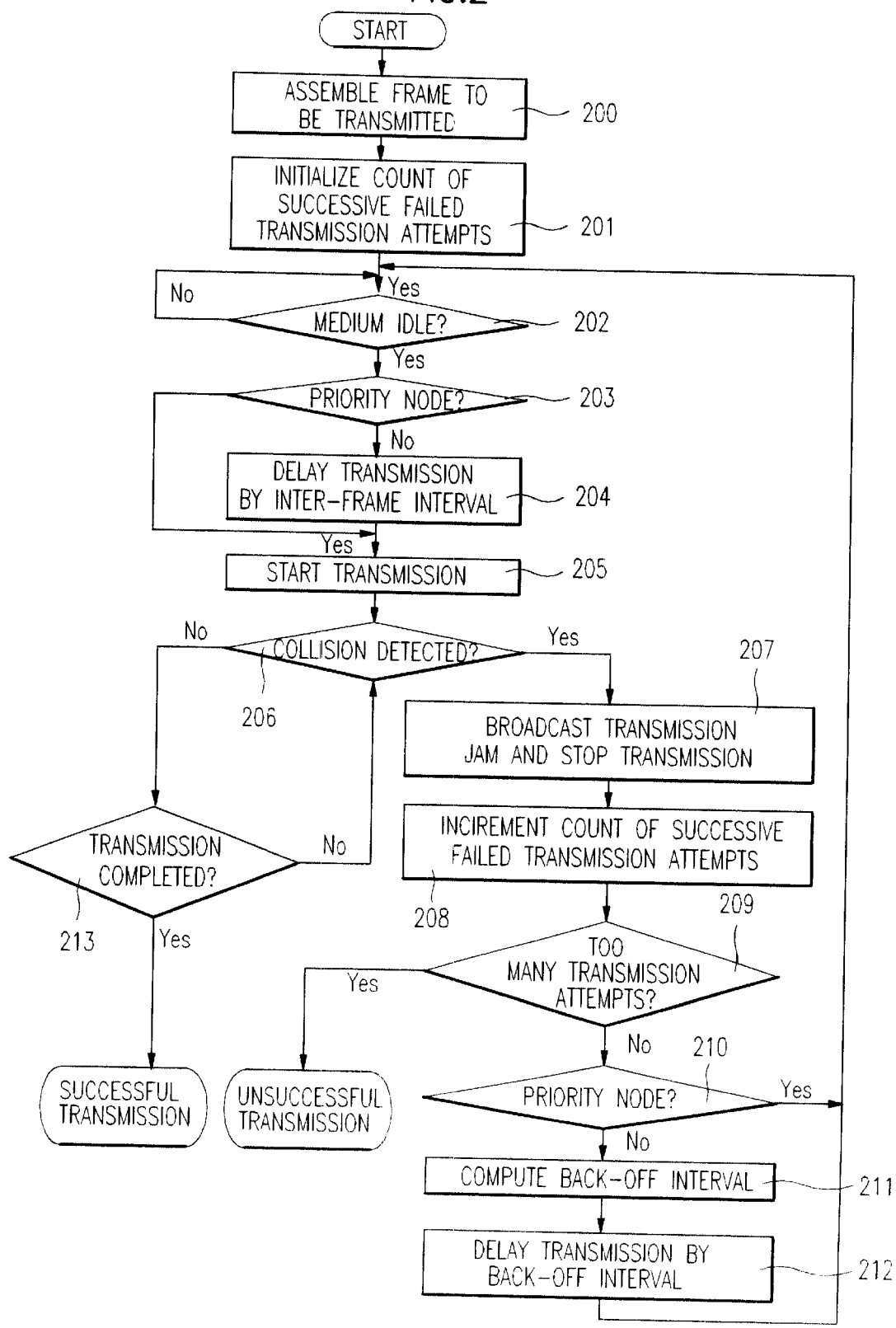

FRAME TRANSMISSION METHOD

BACKGROUND OF THE INVENTION

1. Field of the Invention

The present invention relates to a local area network and, more particularly, to a method of transmitting frames onto the communications medium of a local area network.

2. Discussion of Related Art

The medium-access method of a local area network (LAN), which is the strategy used by the nodes of the network to gain access to the communications medium of the network, is defined at the data-link layer of the Open Systems Interconnection (OSI) reference model (i.e.,at the later immediately above the physical layer) and at the medium-access control sublayer of the ANSI IEEE 802.x networking standards (i.e., at the sublayer immediately above the physical layer). The medium-access control sublayer and the logical-link control sublayer immediately above it of the IEEE 902.x networking standard are together functionally equivalent to the data-link layer of the OSI reference model.

When medium-access control is exercised at the nodes, medium-access is said to be distributed, when medium-access control is exercised at a wiring center (e.g., at a hub), rather than at the nodes, medium-access is said to be centralized. Distributed methods, which include the medium-access methods utilized in a large majority of today's LANs, may be further classified as either deterministic or contentious.

When using a deterministic (or noncontentious) medium-access method, the nodes of the network gain access to the communications medium in an order that is dictated either by a network server of by the arrangement of the nodes themselves. The two most widely-known deterministic medium-access methods are token-passing, which is used in Token Ring networks, and poling, which is typically used in mainframe environments. Deterministic methods are, in general, well-suited to large networks and networks with heavy traffic. In addition, certain applications, such as real-time process control, must be implemented using deterministic medium-access methods.

When a network employs a contentious(or nondeterministic) medium-access method, the first node which gains access to an idle communications medium may not retain access to the medium for long enough to complete transmission of its frame, in stark contrast to the guaranteed access to the medium provided when the network employs a deterministic medium-access method. In general, contentious medium-access methods are well-suited to small networks and networks with light traffic. The best-known contentious medium-access method is undoubtedly Carrier-Sense Multiple Access with Collision-Detect (CSMA/CD), since CSMA/CD is the medium-access method used on Ethernet, the architecture of the great majority of LANs installed during the last 20 years.

Ethernet is a multiple access architecture(the MA in CSMA/CD), since the nodes of the LAN transmit and receive frames over a shared communications medium. The CS in CSMA/CD means that all nodes continuously monitor the communications medium and can distinguish between an idle and a busy medium. This (Carrier-Sense) capability of the nodes is employed to improve the efficiency of the network by avoiding collisions. A node checks for traffic on the communications medium before attempting to transmit a frame onto the medium. If the medium should be busy, the node would defer transmission of the frame until the medium should become idle and only then would initiate transmission of the frame.

The CDSin CSMA/CD means that a node monitors the communications medium as it transmits a frame onto the medium and can detect when the frame has collided with a frame transmitted by another node. This (Collision-Detect) capability of the nodes is utilized to improve the efficiency of the network by reducing the duration of collisions that occur despite the efforts of the adapters to avoid collisions. If a frame being transmitted by a given node should collide with a frame being transmitted by another node, the given node would terminate transmission of its frame after ensuring that it had broadcast a minimum length transmission-jam signal in order to notify all other nodes of the collision.

Frame transmission which utilizes the CSMA/CD medium-access method of the Ethernet variation embodied in the IEEE 802.3 networking standard is described below with reference to the flow chart of FIG.1. Although the sequence of steps of the medium-access method illustrated in the flow chart of FIG. 1 (i.e., the CSMA/CD algorithm of the IEEE 802.3 networking standard) is typically implemented entirely in hardware on a node's 802.3 adapter (also called a network interface card, network board, LAN card, LAN adapter, . . . ), neither the IEEE 802.3 standard nor any variation of Ethernet requires hardware implementation of its medium-access method. The CSMA/CD algorithm could thus be implemented entirely in software on a general-purpose microprocessor, in firmware, with programmable hardware, such as a field programmable gate array, or in a combination of hardware and software.

After an adapter has assembled a frame (100) to be transmitted, initialized to zero(i.e., set equal to zero)a count of successive failed transmission attempts (101), and, by monitoring an analog Carrier-Sense signal of the communications medium, established that the medium is idle (102), the adapter initiates transmission of its frame (105) without negotiating with other adapters. The IEEE 802.3 specification prescribes an upper bound of 1500 bytes for the data field of a frame so that any adapter can control the communications medium for only a limited period of time.

To ensure that no one node can monopolize the communications medium, an adapter must also delay at least 51.2 ms after completing transmission of one frame (104) before initiating transmission of another frame. This minimum inter-frame interval gives other adapters a chance to transmit their frames and therefore prevents any one adapter from transmitting back-to-back frames so close together that adapter is able to maintain continuous control of the communications medium.

Because access to the communications medium is not controlled centrally, two adapters may begin transmitting frames at nearly the same time, either because both adapters found the communications medium to be idle or because both adapters had been waiting for the busy medium to become idle. If and when this happens, two transmissions will overlap or collide (106) on the medium, resulting in a contention appropriately called a collision. If a collision does not occur during transmission of a frame, transmission of the (entire)frame will presumably be completed without incident. (Although the present invention is directed only to frame transmission, it is important to note that successful frame transmission does not guarantee successful frame reception, since frame reception may still be flawed due, for example, to lack of buffer space or a missed interrupt at the receiving adapter.)

A collision can occur only during the initial part of an adapter's transmission, which is often referred to as the collision window of the transmission, before the transmitted signal has had time to propagate to all nodes on the medium. Once the collision window has closed, figuratively speaking, subsequent collisions are avoided, since all other properly functioning adapters notice the transmitted signal (by means of the Carrier-Sense signal) and defer to it.

A transmitting adapter is able to establish that its frame has collided by monitoring an analog Collision-Detect signal on the medium (e.g., by comparing the power or pulse width of a signal received during transmission with that of the signal the adapter is transmitting.)

When a given adapter establishes that its transmission has collided with the trans-mission of another adapter, the given adapter first makes sure to broadcast a transmission-jam signal consisting of at least the first 512 bits of its frame and then terminates transmission of its frame (107). That is, the given adapter truncates its frame after ensuring that at least the first 512 bits of its frame have been transmitted.

The 512-bit minimum length of the transmission-jam signal derives from the 51.2 ms round-trip time of propagation of a signal (i.e., time required for a signal to travel from one end to the other and back) on a maximally-sized network of 2500 m–51.2 ms is enough time to transmit 512 bits on a 10 Mbps network. (According to the IEEE 802.3 standard, a 10-Mbps LAN may include multiple cable segments and multiple repeaters, but no two adapters may be more than 2.5 km apart and no path between any two adapters may traverse more than four repeaters.) In order to ensure that two transmitting adapters at opposite ends of a network both detect a collision between their respective frames, the transmission time for each frame must be at least twice the time required for a frame to travel from and end of the network to the other.

After an adapter has terminated transmission of the frame that it had started to transmit (107), the adapter increments by one (i.e., increases by one) the count of successive failed transmission attempts (108) and determines whether or not the count is equal to a maximum acceptable number of such attempts (109). If the adapter has made the maximum acceptable number of successive failed transmission attempts, the adapter abandons further attempt based on the assumption that the medium has either failed or become overloaded.

If the adapter has not made the maximum acceptable number of successive failed transmission attempts, the adapter delays a random interval of time (112) and then tries to re-transmit. Each time it tries to re-transmit but fails, the adapter doubles the duration of the interval of time it delays (111) before trying to re-transmit. This strategy of doubling the delay interval between successive transmission attempts is an example of a general technique known as exponential back-off. More precisely, the adapter first delays an interval of time uniformly distributed between 0 and 51.2 ms. If this effort fails, it delays a random interval of time uniformly distributed between 0 and 102.4 ms, then between 0 and 204.8 ms, and so on.

The process steps described above are repeated until either transmission of the frame is successfully completed or the count of successive failed transmission attempts equals the maximum acceptable number of such attempts.

The single greatest drawback of contentious medium-access methods is that critical frames may not be transmitted onto the communications medium in a timely manner even when network traffic is light. Contentious medium-access methods generally make no provision for granting priority to a node, even though process steps to establish priority by means of a negotiation among the nodes could be accommodated within the structure of most contentious medium-access methods.

Moreover, contentious medium-access methods in general and CSMA/CD of the IEEE 802.3 networking standard in particular include process steps which would delay transmission of critical frames by nodes with priority. Specifically, after a node with priority had established that the medium was idle, initiation of critical frame transmission would, according to CSMA/CD of the IEEE 902.3 networking standard, be delayed by a minimum inter-frame interval. After a collision has been detected and transmission terminated, re-transmission of the critical frame would be further delayed by a random back-off interval.

SUMMARY OF THE INVENTION

According to the frame transmission method of the present invention, a node checks for traffic on the communications medium before attempting to transmit a frame that the node has in assembled. If the medium is idle, a node with priority immediately initiates transmission of its frame, while a node without priority initiates transmission of its frame only after a minimum inter-frame interval has elapsed.

If the communications medium is busy, a node with a frame to transmit defers trans-mission until the medium becomes idle. A node with priority then immediately initiates transmission of its frame, while a node without priority initiates transmission of its frame only after a minimum inter-frame interval has elapsed.

If a frame being transmitted by a node does not collide during transmission, transmission of the frame is successfully completed.

If a frame being transmitted by a node collides during transmission, the node terminates transmission of its frame after the node has broadcast a transmission-jam signal. A node with priority then immediately attempts to re-transmit its frame, while a node without priority attempts to re-transmit is frame only after a random back-off interval has elapsed.

These process steps are repeated until either transmission of the frame is successfully completed or a count of successive failed transmission attempts equals a maximum acceptable number of such attempts.

BRIEF DESCRIPTION OF THE DRAWINGS

FIG. 2 is a flow chart which illustrated frame transmission in an LAN employing the medium-access method of the present invention.

DETAILED DESCRIPTION OF THE PREFERRED EMBODIMENTS

Figure 1:
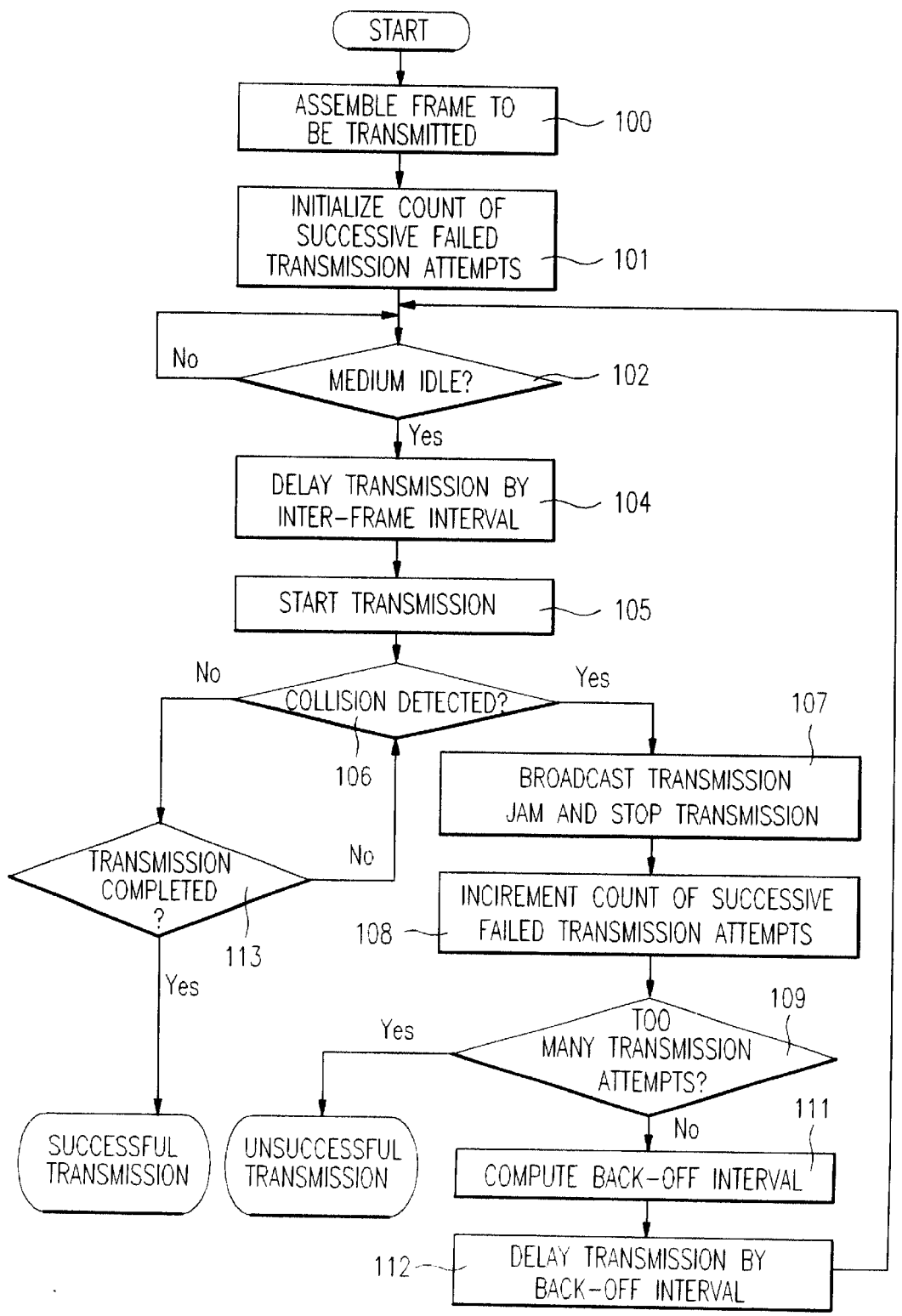
FIG. 1 is a flow chart which illustrates frame transmission in an LAN employing a conventional CSMA/CD medium-access method.

According to the method of the present invention, frame transmission by a node with-out priority utilizes the conventional CSMA/CD medium-access method of the IEEE 802.3 networking standard, while frame transmission by a node with priority utilizes the CMS/CD medium-access method of the IEEE 802.3 networking standard less the steps of delaying frame transmission by minimum inter-frame and random back-off intervals. Since the former was described in the above discussion of art related to the invention, the detailed description below focuses on the latter with reference to the flow chart of FIG. 2, illustrates both frame transmission by a node with priority and frame transmission by node without priority.

After the adapter of a node with priority has assembled a frame to be transmitted (200) on a communications medium (e.g., coaxial cable), has initialized to zero a count of successive failed transmission attempts (201), and, by, monitoring an analog carrier-sense signal of the medium, has established that the medium is idle (202) the node with priority immediately initiates transmission of its frame (205). If, on the other hand, a node with priority establishes that the communications medium is busy, the node with priority defers transmission of its critical frame until the medium becomes idle and then immediately initiates transmission of its frame.

Two adapters may begin transmitting frames at nearly the same time, either because both adapters found the communications medium to be idle or because both adapters had been waiting for the busy medium to become idle. When an adapter of a node with priority established that its frame has collided on the medium with another frame, the adapter first makes sure to broadcast a transmission-jam signal consisting of at least the first 512 bits of its frame and then terminates transmission of its frame (207). That is, the adapter of the node with priority truncates its frame after ensuring that at least the first 512 bits of its frame have been transmitted.

Once an adapter of a node with priority has terminated transmission of its frame (207), the adapter increments by one the count of successive failed transmission attempts (208), determines whether or not it has made a maximum acceptable number of such attempts (209), and, if it has not, immediately tries to re-transmit its frame.

The adapter repeats the process steps described above until either transmission of the frame is successfully completed or the count of successive failed transmission attempts is equal to the maximum acceptable number (typically 16) of such attempts.

The embodiments described above are intended to illustrate the invention, but not to exhaustively delineate every detail of the invention as practiced. It will be apparent to those skilled in the art that various modifications can be made to the frame transmission method of the present invention without departing from the spirit of the invention. The present invention is thus intended to cover such modifications provided they fall within the scope of the appended claims and their equivalents.

What is claimed is:

1. A method of a frame transmission on a communication medium by a node of a local area network, the method comprising the steps of:
   (a) initializing to zero a count of successive failed transmission attempts by the node;
   (b) if the node has a priority, initiating the transmission of the frame when the communications medium becomes idle,
   (c) if the node does not have the priority, initiating rhw transmission of the frame when an inter-frame interval has elapsed after the communication medium becomes idle,
   (d) if the frame does not collide during transmission, completing the transmission of the frame,
   (e) if the frame collides during transmission and the node has the priority, broadcasting a transmission-jam signal on the communication medium, terminating transmission of the frame, and incrementing by one the count of successive failed transmission attempts by the node,
   (f) if the frame collides during transmission and the node does not have the priority, broadcasting a transmission-jam signal on the communication medium, terminating transmission of the frame, incrementing by one the count of successive failed transmission attempts by the node, and waiting a random back-off interval, and
   (g) repeating steps (b) through (f) until either the frame transmission is completed or the count of successive failed transmission attempts by the node is equal to a maximum acceptable number.

2. The method according to claim 1, further comprising the steps of:
   monitoring a carrier-sense signal of the communication medium to establish whether or not the communication medium is idle; and
   monitoring a collision-detect signal of the communication medium during transmission of the frame to establish whether or not the frame collides during transmission.

* * * * *